Patented Aug. 3, 1948

2,446,172

UNITED STATES PATENT OFFICE 2,446,172

2-ACYLAMINO-1,3-BUTADIENES

Joseph B. Dickey, Rochester, N. Y., assignor to Eastman Kodak Company, Rochester, N. Y., a corporation of New Jersey No Drawing. Application December 22, 1945, Serial No. 637,093

7 Claims. (Cl. 260—558)

The present invention relates to 2-acylamino-1,3-butadienes and to methods of preparing the same. More specifically, the invention relates to conjugated dienes of the general formula:

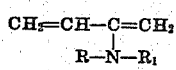

wherein R represents a member of the group consisting of hydrogen, an alkyl group, an aryl group of the benzene series, and an acyl group; and $R_1$ represents an acyl group. The term "alkyl" can be methyl, ethyl, propyl, butyl, lauryl and the like groups; and the term "aryl" can be a phenyl group, wherein the free positions can be further substituted by one or more chlorine, bromine, fluorine or iodine atoms, an alkyl group, a nitro group, a sulfonamide group. Acyl group can be, for example, acetyl, propionyl, butyryl, benzoyl, methane sulfonyl, benzene sulfonyl, furoyl, acryl, amido, alkylamido, arylamido,

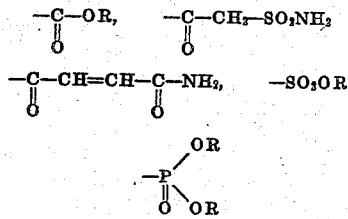

wherein R is a carbon chain radical, and similar kind of groups.

The compounds of the invention can be prepared by treating 2-aminobutadiene-1,3 or its N-monosubstituted derivatives with acylating agents, and isolating the products thereby obtained. The intermediate 2-amino-1,3-butadienes can be prepared by heating the corresponding 2-aminobutine-3 in gas phase to elevated temperatures. The acylating agent can be, for example, an acid such as acetic acid, butyric acid, an acid halide such as benzoyl chloride, acetyl chloride, an anhydride of a carboxylic acid, for example, acetic, propionic, butyric, phthalic anhydrides, an organic thiocyanate or isocyanate, for example, isocyanic acid, or an organic chlorocarbonate. In some cases, the use of a catalyst, such as sulfuric acid, facilitates the reaction and improved the yield of product.

The 2-acylamino-1,3-butadiene compounds of the invention may be used as starting materials for chemical reactions. They are also useful in the copolymerization with other vinyl compounds to provide resinous materials which are suitable for making fibers, threads, filaments, films, and similar kinds of useful products.

It is, accordingly, an object of my invention to provide new 2-acylamino-1,3-butadiene compounds. A further object is to provide a method for preparing the same. Other objects will become apparent hereinafter.

The following examples will serve to illustrate my new compounds and the manner of their preparation.

Example I.—2-amino-1,3-butadiene

The 2-amino-1,3-butadiene and N-monosubstituted derivatives thereof were prepared by the general method described in U. S. Patent No. 2,301,971, issued November 17, 1942, to Walter Reppe and Otto Hecht, except that 2-aminobutine-3, was passed through a heated porcelain tube at a temperature of 245–254° C., and a velocity of about 50 grams per hour per liter of catalyst. The vapors emerging from the tube were condensed and the product purified by fractional distillation at 40-mm. pressure.

In place of 2-aminobutine-3, there can be substituted in the above example 2-acetylaminobutine-3 to obtain 2-acetylaminobutadiene-1,3 or 2-N-ethylamino-butine-3 to obtain N-ethylaminobutadiene-1,3.

Example II.—2-acetylaminobutadiene-1,3

Ten grams of 2-aminobutadiene-1,3 was suspended in 50 cc. of ice water and 10 grams of acetic anhydride slowly added. When all the anhydride had reacted, the product was separated from the reaction mixture, washed with water and dried.

Example III.—2-benzoylaminobutadiene-1,3

Seven grams of 2-aminobutadiene-1,3 was dissolved in 100 cc. of dioxane and 14 grams of benzoyl chloride and 5.8 grams of sodium bicarbonate added. After the evolution of gas had ceased, the mixture was heated to boiling, the salt filtered out and the 2-benzoylaminobutadiene-1,3 recovered by crystallization.

Example IV.—N-ethyl-2-acetylamino-1,3-butadiene

Ten grams of 2-N-ethylamino-1,3-butadiene was suspended in 100 cc. water with 10 grams of acetic anhydride and stirred in the cold until all the anhydride had reacted. The product was removed from the mixture by extraction with benzene and ether, followed by washing with water.

Example V.—2-N-acetyl-N-phenylamino-1,3-butadiene

Thirteen grams of 2-N-phenylamino-1,3-butadiene, 100 cc. of water and 11 grams of acetic anhydride were reacted with stirring in the cold, until all the anhydride had been used up. The compound was filtered off as a yellowish white solid.

Example VI.—2-diacetylamino-1,3-butadiene

Twenty grams of 2-acylaminobutadiene-1,3, 50 grams of acetic anhydride and 0.1 gram of copper acetate were heated in a nitrogen filled autoclave for several hours at 200° C. The reaction mass was cooled, the acetic acid and anhydride removed by evaporation under reduced pressure, water added to the residue and the solid compound filtered out and dried.

What I claim is:

1. The 2-acylamino-1,3-butadiene having the general formula:

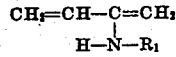

wherein $R_1$ represents the acyl radical of an alkyl carboxylic acid of from 2 to 4 carbon atoms.

2. The compound 2-acetylaminobutadiene-1,3.
3. The compound 2-benzoylaminobutadiene-1,3.
4. The compound N-ethyl-2-acetylamino-1,3-butadiene.
5. The 2-acylamino-1,3-butadienes having the general formula:

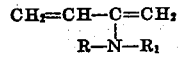

wherein R represents a member selected from the group consisting of hydrogen, an alkyl group of from 1 to 12 carbon atoms and an aryl group of the benzene series, and $R_1$ represents a member selected from the group consisting of the acyl radical of an alkyl carboxylic acid of from 2 to 5 carbon atoms and the acyl radical of an arylcarboxylic acid of the benzene series.

6. The 2-acylamino-1,3-butadienes having the general formula:

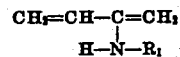

wherein $R_1$ represents the acyl radical of an arylcarboxylic acid of the benzene series.

7. The acylamino-1,3 butadienes having the general formula:

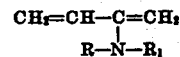

wherein R represents an alkyl group of from 1 to 12 carbon atoms and $R_1$ represents the acyl radical of an alkyl carboxylic acid of from 2 to 5 carbon atoms.

JOSEPH B. DICKEY.

REFERENCES CITED

The following references are of record in the file of this patent:

UNITED STATES PATENTS

| Number | Name | Date |
|---|---|---|
| 2,073,363 | Carothers et al. | Mar. 9, 1937 |
| 2,238,682 | Dykstra et al. | Apr. 15, 1941 |
| 2,301,971 | Reppe et al. | Nov. 17, 1942 |
| 2,377,585 | Standinger et al. | June 5, 1945 |

OTHER REFERENCES

Muskat et al.: "Jour. Am. Chem. Soc.," vol. 55 (1933), page 3768.